United States Patent [19]
Deylitz

[11] Patent Number: 6,100,778
[45] Date of Patent: Aug. 8, 2000

[54] MOVABLY DISPOSED CIRCUIT BREAKER HAVING A BLOW-OUT ATTENUATOR

[75] Inventor: Erhard Deylitz, Berlin, Germany

[73] Assignee: Siemens AG, Munich, Germany

[21] Appl. No.: 09/269,157

[22] Filed: Mar. 16, 1999

[30] Foreign Application Priority Data

Sep. 16, 1996 [DE] Germany ............................ 196 38 948

[51] Int. Cl.⁷ ................................................. H01H 9/02
[52] U.S. Cl. ............................ 335/201; 335/132; 218/156
[58] Field of Search .................................... 335/201, 202, 335/132; 218/34, 35, 41, 76, 77, 78, 81, 155, 156, 157; 200/295–306

[56] References Cited

U.S. PATENT DOCUMENTS

| | | | |
|---|---|---|---|
| 2,919,329 | 12/1959 | Latour | 218/154 |
| 3,706,868 | 12/1972 | Rys | 218/157 |
| 4,356,360 | 10/1982 | Volz | 200/291 |
| 4,876,424 | 10/1989 | Leone et al. | 200/304 |
| 4,894,497 | 1/1990 | Lycan | 218/157 |
| 5,304,761 | 4/1994 | Rosen et al. | 218/157 |
| 5,710,402 | 1/1998 | Karnbach et al. | 218/157 |
| 5,753,878 | 5/1998 | Doughty et al. | 218/157 |
| 5,811,748 | 9/1998 | Manthe et al. | 218/155 |
| 5,811,749 | 9/1998 | Bausch et al. | 218/157 |

FOREIGN PATENT DOCUMENTS

| | | |
|---|---|---|
| 437 151 | 7/1991 | European Pat. Off. . |
| 2 165 942 | 7/1973 | Germany . |
| 44 20 584 | 11/1995 | Germany . |
| 44 20 582 | 12/1995 | Germany . |

*Primary Examiner*—Lincoln Donovan
*Attorney, Agent, or Firm*—Kenyon & Kenyon

[57] ABSTRACT

A movably disposed circuit breaker has a blow-out attenuator for cooling and deionizing switching gases escaping from an arc quenching chamber. The blow-out attenuator is composed of two telescopically interlocking sub-members. The one sub-member is fixedly arranged, while the other sub-member rests with a sealing surface on a mouth surface of the arc quenching chamber. Due to the two-part design of the blow-out attenuator, the switching-gas pressure improves the sealing action between the arc quenching chambers and the blow-out attenuator.

3 Claims, 1 Drawing Sheet

MOVABLY DISPOSED CIRCUIT BREAKER HAVING A BLOW-OUT ATTENUATOR

FIELD OF THE INVENTION

The present invention relates to a movably disposed circuit breaker having an arc quenching chamber and a blow-out attenuator interacting with the arc quenching chamber for cooling and deionizing the switching gases escaping from the arc quenching chamber during switching, the blow-out attenuator being fixedly arranged and having a sealing surface interacting with a mouth surface of the arc quenching chamber in response to the motion of the circuit breaker.

BACKGROUND INFORMATION

German Patent No. 2 165 942 describes two embodiments of a circuit breaker. In one embodiment, the circuit breaker can be inserted into and withdrawn from the cubicle of a switchgear by a rectilinear traveling motion, the joint between the arc quenching chamber and the blow-out attenuator being arranged at an angle to the moving direction to achieve a wedge-type interaction.

In the other of the two embodiments, the circuit breaker has an approximately cylindrical housing and can be inserted into the switchgear by a rotary motion. In the course of the rotary motion, the mouth surface of the arc quenching chamber and the sealing surface of the blow-out attenuator engage with one another.

The purpose of the blow-out attenuator is to affect the switching gases emerging during the switching of the circuit breaker in such a way that they exhibit electrically neutral properties, thereby avoiding the requirement for a safety clearance between the mouth of the blow-out attenuator and live or grounded parts.

It is essential for the desired functioning of the described arrangement that the blow-out attenuator reliably engage with the arc quenching chamber when inserting the circuit breaker into its operating position to avoid leakage, thereby preventing switching gases from escaping at the joint between the arc quenching chamber and the blow-out attenuator. It is also necessary to ensure a sufficient resistance to the switching-gas pressure, to be able to make full use of the switching capacity of the circuit breaker.

SUMMARY OF THE INVENTION

An object of the present invention is to improve the sealing between the arc quenching chamber and the associated blow-out attenuator.

This objective is achieved according to the present invention in that the blow-out attenuator has two telescopically interlocking sub-members, one sub-member thereof being fixedly arranged, and the other sub-member having the sealing surface.

Due to the design provided for the blow-out attenuator, the sub-member of the blow-out attenuator that is provided with the sealing surface is pressed against the mouth surface of the arc quenching chamber by the switching gases, thereby improving the sealing action. Therefore, it may not be necessary to use sealing materials, which are subject to wear and tear, between the mouth surface of the arc quenching chamber and the sealing surface of the blow-out attenuator.

Circuit breakers having the type of construction discussed here generally have an arc quenching chamber, which is open at the top. Therefore, the blow-out attenuator is also located above the circuit breaker. Thus, the result of the telescopic design of the blow-out attenuator is that the sub-member provided with the sealing surface rests with its own weight on the mouth surface of the arc quenching chamber. The minimum sealing value resulting from this can be increased within the framework of the present invention, in that the blow-out attenuator sub-member provided with the sealing surface is preloaded against the arc quenching chamber by at least one spring. To protect such a spring from the influence of the switching gases, it can be arranged in likewise telescopically interlocking sections of the sub-members.

DETAILED DESCRIPTION

Figure 1:
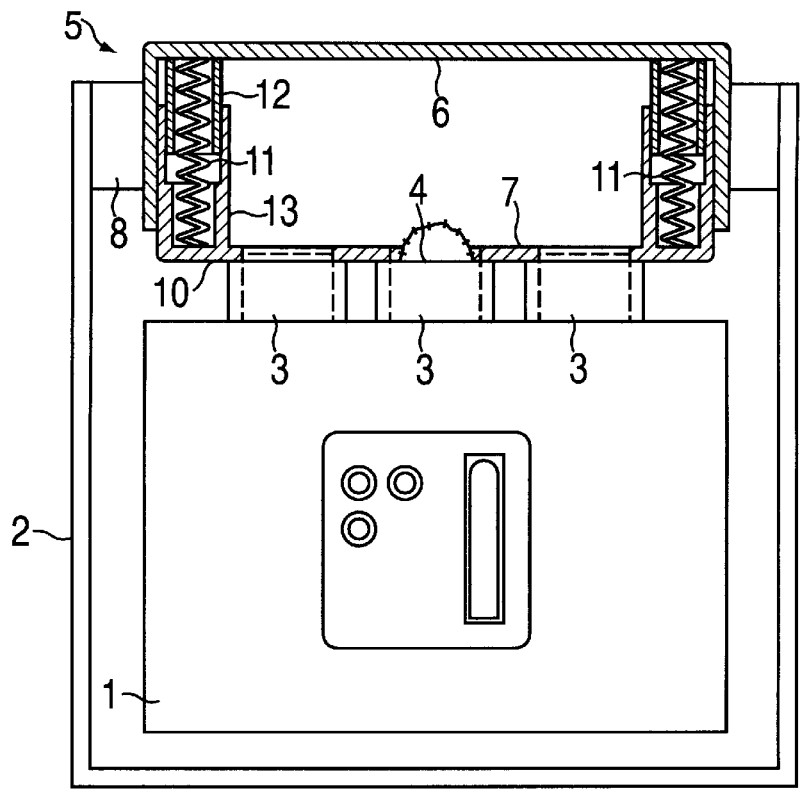
FIG. 1 shows a partially cut-off front view of a movably disposed circuit breaker having a blow-out attenuator according to the present invention.
Figure 2:
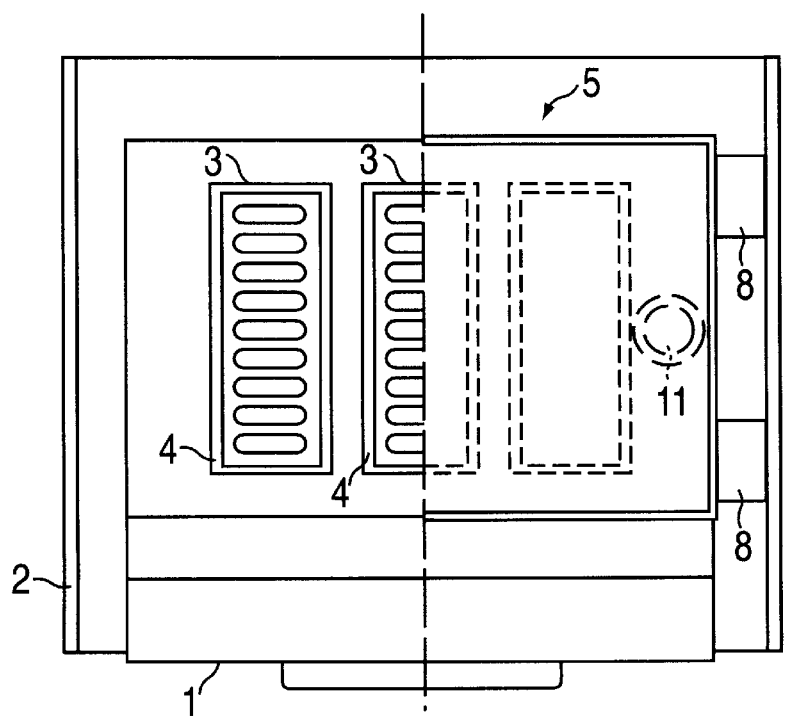
FIG. 2 shows a top view of the arrangement according to FIG. 1, and specifically without the blow-out attenuator to the left of a dot-dash line.

As shown in FIGS. 1 and 2, a circuit breaker 1 is movably disposed in a slide-in frame 2. In a conventional manner, circuit breaker 1 is able to occupy a disconnected position, a test position and a connected position in slide-in frame 2. No traveling mechanism, guiding means or breakcontact arrangements are depicted in the present context, since these elements are generally known and described, for example, in German Patent Nos. 2 165 942, 44 20 582, or 44 20 584. To the right of a dot-dash line, FIG. 2 shows circuit breaker 1 with a mounted blow-out attenuator 5, the blow-out attenuator being omitted on the left of the mentioned line to allow mouth surfaces 4 of arc quenching chambers 3 to be seen.

In the exemplary embodiment, circuit breaker 1 is a three-pole low-voltage circuit breaker, whose arc quenching chambers 3 are open at the top, where they have mouth surfaces 4. A blow-out attenuator 5 is arranged above circuit breaker 1. Blow-out attenuator 5 includes two sub-members 6 and 7 which engage each other telescopically, one sub-member 6 thereof being fastened to slide-in frame 2 by schematically indicated holding devices 8. The other sub-member 7 is displaceably supported in stationary sub-member 6, and has a sealing surface 10.

In the conventional manner, mouth surfaces 4 of arc quenching chambers 3 are forced into engagement with sealing surface 10 when circuit breaker 1 is moved into its operating position within slide-in frame 2. In so doing, sub-member 7 of blow-out attenuator 5 rests under its own weight on arc quenching chambers 3.

During the switching of circuit breaker 1, the switching gases from arc quenching chambers 3 enter into blow-out attenuator 5, from where, cooled and deionized, they are released into the surroundings. Due to the telescope-like guidance of inner sub-member 7 in outer, fixedly supported sub-member 6, the switching-gas pressure increases the pressure force between sealing surface 10 and mouth surfaces 4.

To already improve the sealing tightness of the described arrangement in the rest state, the exemplary embodiment is provided with two springs 11, which press inner sub-member 7 against mouth surfaces 4. Springs 11 are protected from the corrosive influence of the switching gases, in that they are arranged in likewise telescopically interlocking sections 12 and 13 of sub-members 6 and 7. The size of blow-out attenuator 5 and its proportions determine whether it may be advisable to provide a greater or a lesser number of springs 11.

What is claimed is:

1. A draw-out circuit breaker moveable between a connected position and a disconnected position, comprising:

an arc quenching chamber having a mouth surface; and a blow-out attenuator interacting with the arc quenching chamber to cool and deionize switching gases escaping from the arc quenching chamber during a switching operation, the blowout attenuator including first and second sub-members which engage each other telescopically, the first sub-member being fixedly arranged, the second sub-member having a sealing surface, the sealing surface interacting with the mouth surface of the arc quenching chamber in response to moving the circuit breaker into the connected position.

2. The circuit breaker according to claim 1, wherein the second sub-member is preloaded against the arc quenching chamber by at least one spring.

3. The circuit breaker according to claim 2, wherein the at least one spring is arranged in a space defined by sections of the first and second sub-members which engage each other telescopically.

* * * * *